US010200804B2

(12) United States Patent
Chen et al.

(10) Patent No.: US 10,200,804 B2
(45) Date of Patent: Feb. 5, 2019

(54) VIDEO CONTENT ASSISTED AUDIO OBJECT EXTRACTION

(71) Applicant: Dolby Laboratories Licensing Corporation, San Francisco, CA (US)

(72) Inventors: Lianwu Chen, Beijing (CN); Xuejing Sun, Beijing (CN); Lie Lu, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/553,536

(22) PCT Filed: Feb. 24, 2016

(86) PCT No.: PCT/US2016/019405
§ 371 (c)(1),
(2) Date: Aug. 24, 2017

(87) PCT Pub. No.: WO2016/138168
PCT Pub. Date: Sep. 1, 2016

(65) Prior Publication Data
US 2018/0054689 A1 Feb. 22, 2018

Related U.S. Application Data

(60) Provisional application No. 62/130,247, filed on Mar. 9, 2015.

(30) Foreign Application Priority Data

Feb. 25, 2015 (CN) .......................... 2015 1 0087313

(51) Int. Cl.
*H04S 3/00* (2006.01)
*G10L 19/20* (2013.01)
(Continued)

(52) U.S. Cl.
CPC .......... *H04S 3/008* (2013.01); *G06K 9/00718* (2013.01); *G10L 19/20* (2013.01);
(Continued)

(58) Field of Classification Search
CPC ....... G10L 19/20; G10L 19/084; G10L 25/48; H04S 2400/04; H04S 2400/03
(Continued)

(56) References Cited

U.S. PATENT DOCUMENTS

| 1,124,580 A | 1/1915 | Amet |
| 1,793,772 A | 2/1931 | Bouma |

(Continued)

FOREIGN PATENT DOCUMENTS

| EP | 1035732 | 9/2000 |
| GB | 394325 | 6/1933 |

(Continued)

OTHER PUBLICATIONS

Yang L. et al., "Multi-modality web video categorization", pp. 265-274, Sep. 28-29, 2007 (webpage).
(Continued)

*Primary Examiner* — Melur Ramakrishnaiah

(57) ABSTRACT

Embodiments of the present invention relate to video content assisted audio object extraction. A method of audio object extraction from channel-based audio content is disclosed. The method comprises extracting at least one video object from video content associated with the channel-based audio content, and determining information about the at least one video object. The method further comprises extracting from the channel-based audio content an audio object to be rendered as an upmixed audio signal based on the determined information. Corresponding system and computer program product are also disclosed.

23 Claims, 4 Drawing Sheets

(51) Int. Cl.
   *G06K 9/00* (2006.01)
   *H04S 3/02* (2006.01)
(52) U.S. Cl.
   CPC ............ *H04S 3/02* (2013.01); *H04S 2400/01* (2013.01); *H04S 2400/11* (2013.01); *H04S 2420/11* (2013.01)
(58) Field of Classification Search
   USPC ..................... 700/94; 386/285; 382/154, 190
   See application file for complete search history.

(56) References Cited

U.S. PATENT DOCUMENTS

| | | | |
|---|---|---|---|
| 1,850,130 | A | 3/1932 | Gannett |
| 5,850,455 | A | 12/1998 | Arnold |
| 6,040,831 | A | 3/2000 | Nishida |
| 6,154,549 | A | 11/2000 | Arnold |
| 6,507,658 | B1 | 1/2003 | Abel |
| 7,106,881 | B2 | 9/2006 | Backman |
| 7,602,924 | B2 | 10/2009 | Kleen |
| 7,684,982 | B2 | 3/2010 | Taneda |
| 8,145,656 | B2 | 3/2012 | Shatz |
| 8,208,663 | B2 | 6/2012 | Jeong |
| 8,295,516 | B2 | 10/2012 | Kondo |
| 8,370,869 | B2 | 2/2013 | Paek |
| 8,483,414 | B2 | 7/2013 | Kondo |
| 8,515,759 | B2 | 8/2013 | Engdegard |
| 8,699,858 | B2 | 4/2014 | Liu |
| 8,755,543 | B2 | 6/2014 | Chabanne |
| 9,172,901 | B2 | 10/2015 | Chabanne |
| 9,756,445 | B2 | 9/2017 | Wang |
| 9,786,288 | B2 | 10/2017 | Hu |
| 2003/0053680 | A1* | 3/2003 | Lin .......................... H04S 5/005 382/154 |
| 2005/0047624 | A1 | 3/2005 | Kleen |
| 2006/0059120 | A1 | 3/2006 | Xiong |
| 2006/0176902 | A1 | 8/2006 | Bellordre |
| 2006/0206221 | A1 | 9/2006 | Metcalf |
| 2007/0019831 | A1 | 1/2007 | Usui |
| 2007/0169555 | A1 | 7/2007 | Gao |
| 2008/0165992 | A1 | 7/2008 | Kondo |
| 2009/0094113 | A1 | 4/2009 | Berry |
| 2010/0119092 | A1 | 5/2010 | Kim |
| 2011/0160886 | A1 | 6/2011 | Lee |
| 2012/0195447 | A1 | 8/2012 | Hiruma |
| 2014/0037117 | A1 | 2/2014 | Tsingos |
| 2014/0133683 | A1 | 5/2014 | Robinson |
| 2014/0233917 | A1* | 8/2014 | Xiang .................. G11B 27/031 386/285 |
| 2017/0215019 | A1 | 7/2017 | Chen |

FOREIGN PATENT DOCUMENTS

| | | |
|---|---|---|
| JP | 02-059000 | 2/1990 |
| JP | 5-60049 | 8/1993 |
| JP | 06327090 | 11/1994 |
| JP | 2691185 | 12/1997 |
| JP | H09-512159 | 12/1997 |
| JP | 2007-506323 | 3/2007 |
| JP | 2007-134939 | 5/2007 |
| JP | 2007-158527 | 6/2007 |
| JP | 2007-236005 | 9/2007 |
| JP | 2007-266967 | 10/2007 |
| JP | 4010161 | 11/2007 |
| JP | 2008-034979 | 2/2008 |
| JP | 2008-109209 | 5/2008 |
| JP | 2009-267745 | 11/2009 |
| JP | 2010-041579 | 2/2010 |
| JP | 2011-155374 | 8/2011 |
| JP | 2014-049885 | 3/2014 |
| WO | 2009/116800 | 9/2009 |
| WO | 2010/125104 | 11/2010 |
| WO | 2011/039195 | 4/2011 |
| WO | 2011/048067 | 4/2011 |
| WO | 2011/061174 | 5/2011 |

OTHER PUBLICATIONS

Liu Z. et al., "Audio Feature Extraction and analysis for scene segmentation and classification", Journal of VLSI signal processing systems for signal, image and video technology 20.1-2, pp. 1-39, 1998.
Xu L. et al., "Video Classification using Spatial Temporal Features and PCA", Multimedia and Expo, ICME '03 Proceedings, International Conference on vol. 3, pp. 1-5, Jul. 6-9, 2003.
Ma Y. et al., "A User Attention Model for Video Summarization", ACM Multimedia'02, pp. 1-10, Dec. 2002.
Komiyama S., "Subjective evaluation of angular displacement between picture and sound directions for HDTV sound systems", Journal of the Audio Engineering Society, 37(4): 210-214, Apr. 1989.
Wang D., "Unsupervised video segmentation based on watersheds and temporal tracking", IEEE Transactions on Circuits and Systems for Video Technology 8(5): 539-546, Sep. 1998.
Super B.J. et al., "Shape from texture using local spectral moments", IEEE Transactions on Pattern Analysis and Machine Intelligence, 17(4): 333-343, Apr. 1995.
Torralba A. et al., "Depth estimation from image structure", IEEE Transactions on Pattern Analysis and Machine Intelligence, 24(9): 1226-1238, Sep. 2002.
Ozerov A. et al., "Multichannel nonnegative matrix factorization in convolutive mixtures for audio source separation", IEEE Transactions on Audio, Speech and Language Processing, 18(3): 550-563, Mar. 2010.
Oldfield R. et al., "Object-based audio for interactive football broadcast", Multimedia Tools and Applications, vol. 74 No. 8, pp. 2717-2741, XP055208264, May 1, 2013.
Wang W. et al., "Citation Video Assisted speech source separation", Proceedings of 2005 IEEE International Conference on Acoustics, Speech and Signal Processing (ICASSP 2005), vol. 5 pp. 425-428, XP055268799, Mar. 18, 2005.
Khan M. et al., "Video-Aided Model-Based Source Separation in Real Reverberant Rooms", IEEE Transactions on Audio, Speech and Language Processing, vol. 21 No. 9, pp. 1900-1912, XP011519074, Sep. 1, 2013.
Davis, Mark F., "History of Spatial Coding", J. Audio Eng. Soc., vol. 51, No. 6, Jun. 2003.
Lee, Taejin, et al., "A Personalized Preset-based Audio System for Interactive Service" AES Paper, presented at the 121st Convention, Oct. 5-8, 2006.
Mayfield, Mark, "Localization of Sound to Image" A Conceptual Approach to a Closer-to-Reality Moviegoing Experience, 8 pages; Undated.

* cited by examiner

VIDEO CONTENT ASSISTED AUDIO OBJECT EXTRACTION

CROSS-REFERENCE TO RELATED APPLICATIONS

This application claims the benefit of priority to Chinese Patent Application No. 201510087313.X, filed on 25 Feb. 2015 and U.S. Provisional Application No. 62/130,247, filed on 9 Mar. 2015, hereby incorporated by reference in its entirety.

TECHNOLOGY

Embodiments of the present invention generally relate to audio content processing, and more specifically, to a method and system of video content assisted audio object extraction.

BACKGROUND

Traditionally, audio content is created and stored in channel-based formats. As used herein, the term "audio channel" or "channel" refers to the audio content that usually has a predefined physical location. For example, stereo, surround 5.1, surround 7.1 and the like are all channel-based formats for audio content. Recently, with the development in the multimedia industry, three-dimensional (3D) audio content is getting more and more popular in cinema and home. In order to create a more immersive sound field and to control discrete audio elements accurately, irrespective of specific playback speaker configurations, many conventional playback systems need to be extended to support a new format of audio that includes both the audio channels and audio objects.

As used herein, the term "audio object" refers to an individual audio element that exists for a defined duration of time in the sound field. An audio object may be dynamic or static. For example, an audio object may be human, animal or any other object serving as a sound source in the sound field. Optionally, the audio objects may have associated metadata, such as the information describing the position, velocity, and the size of an object. Use of the audio objects enables the audio content to have a highly immersive listening experience, while allowing an operator, such as an audio mixer, to control and adjust the audio objects in a convenient manner. During transmission, the audio objects and channels can be sent separately, and then used by a reproduction system on the fly to recreate the artistic intention adaptively based on the configuration of playback speakers. As an example, in a format known as "adaptive audio content," or "upmixed audio signal," there may be one or more audio objects and one or more "audio beds". As used herein, the term "audio beds" or "beds" refers to audio channels that are meant to be reproduced in pre-defined, fixed locations.

In general, object-based audio content is generated in a quite different way from the traditional channel-based audio content. Although the new object-based format allows the creation of a more immersive listening experience with the aid of audio objects, the channel-based audio format, especially the final-mixing audio format, still prevails in movie sound ecosystem, for example, in the chains of sound creation, distribution and consumption. As a result, given a traditional channel-based content, in order to provide the end users with similar immersive experiences as provided by the audio objects, there is a need to extract the audio objects from the traditional channel-based content.

SUMMARY

In order to address the foregoing and other potential problems, the present invention proposes a method and system of audio object extraction from channel-based audio content.

In one aspect, embodiments of the present invention provide a method of audio object extraction from channel-based audio content. The method comprises extracting at least one video object from video content associated with the channel-based audio content and determining information about the at least one video object. The method further comprises extracting from the audio content an audio object to be rendered as an upmixed audio signal based on the determined information. Embodiments in this regard further comprise a corresponding computer program product.

In another aspect, embodiments of the present invention provide a system of audio object extraction from channel-based audio content. The system comprises a video object extraction unit configured to extract at least one video object from video content associated with the channel-based audio content, and an information determination unit configured to determine information about the at least one video object. The system further comprises an audio object extraction unit configured to extract from the channel-based audio content an audio object to be rendered as an upmixed audio signal based on the determined information.

Through the following description, it would be appreciated that in accordance with the embodiments of the present invention, video objects are first extracted from the video content that is aligned with the channel-based audio content and then information about the video objects is used for audio object extraction from the channel-based audio content. Extracted audio objects can be used for rendering as an upmixed audio signal. With the assistance of the complementary video object based information, the performance of the audio object extraction can be improved. Other advantages achieved by embodiments of the present invention will become apparent through the following descriptions.

DESCRIPTION OF DRAWINGS

Through the following detailed description with reference to the accompanying drawings, the above and other objectives, features and advantages of embodiments of the present invention will become more comprehensible. In the drawings, several embodiments of the present invention will be illustrated in an example and non-limiting manner, wherein.

Throughout the drawings, the same or corresponding reference symbols refer to the same or corresponding parts.

DESCRIPTION OF EXAMPLE EMBODIMENTS

Figure 1:
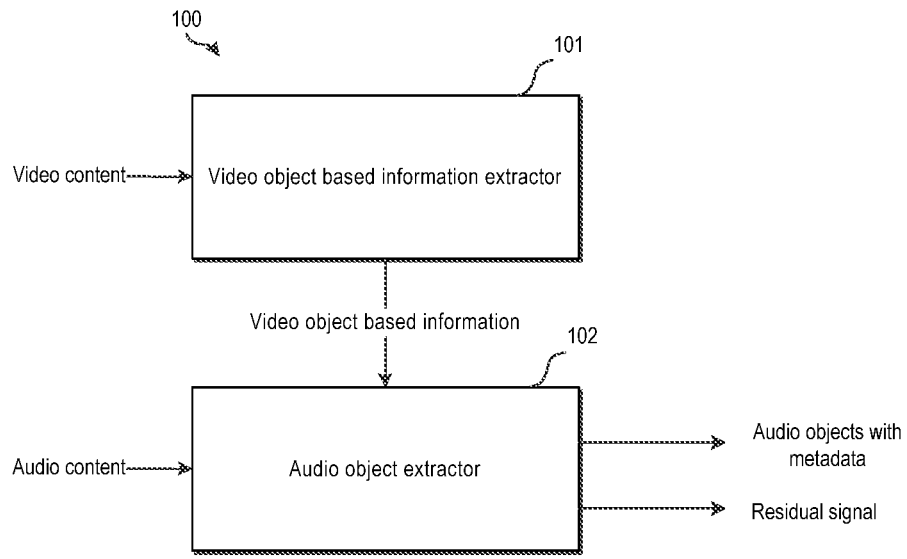
FIG. 1 illustrates a block diagram of a framework for video content assisted audio object extraction from audio content in accordance with an example embodiment of the present invention.

Principles of the present invention will now be described with reference to various example embodiments illustrated in the drawings. It should be appreciated that depiction of these embodiments is only to enable those skilled in the art to better understand and further implement the present invention, not intended for limiting the scope of the present invention in any manner.

As mentioned above, it is desired to extract audio objects from audio content of traditional channel-based formats. Since during audio mixing, the audio mixer always mixes different sound sources into the channel-based audio content aligned with the video content, the video content may be used to assist the audio object extraction, for example by the complementary object information in the video content. On the other hand, while various audio objects are mixed together in the one-dimensional audio content signal, the corresponding visual objects (video objects) are probably separated in the two-dimensional video content signal. Therefore, the information of separated video objects can be used to improve the extraction of mixed audio objects in an audio object extraction system. Moreover, extracting audio objects by video object based information may further improve the listening experience, since it is demonstrated that close alignment of audio and video content may create more immersive listening experience, while misalignments between audio and video content may cause some confusion for audience.

In view of the above, embodiments of the present invention propose a solution for video content assisted audio object extraction from audio content. A framework 100 for the video content assisted audio object extraction from audio content in accordance with an example embodiment of the present invention is shown in FIG. 1. The video content aligned with the channel-based audio content is processed in a video object based information extractor 101 to obtain video object based information. This information can be used as assistance information for audio object extraction and is then provided to an audio object extractor 102. The audio object extractor 102 applies audio object extraction on the input audio content according to the video object based information. During the audio object extraction, one or more audio objects may be extracted from the audio content and the remaining audio in the audio content other than the audio object signals may be regarded as residual signal. Also, metadata associated with the extracted audio objects may also be estimated by the audio object extractor 102 according to the video object based information. The extracted audio objects may then be used for rendering as an upmixed audio signal with the residual signal by using the audio object metadata. In the rendering, the residual signal may be rendered as audio beds. In the proposed solution, the video object based information is available to improve the performance of the audio object extraction.

Figure 2:
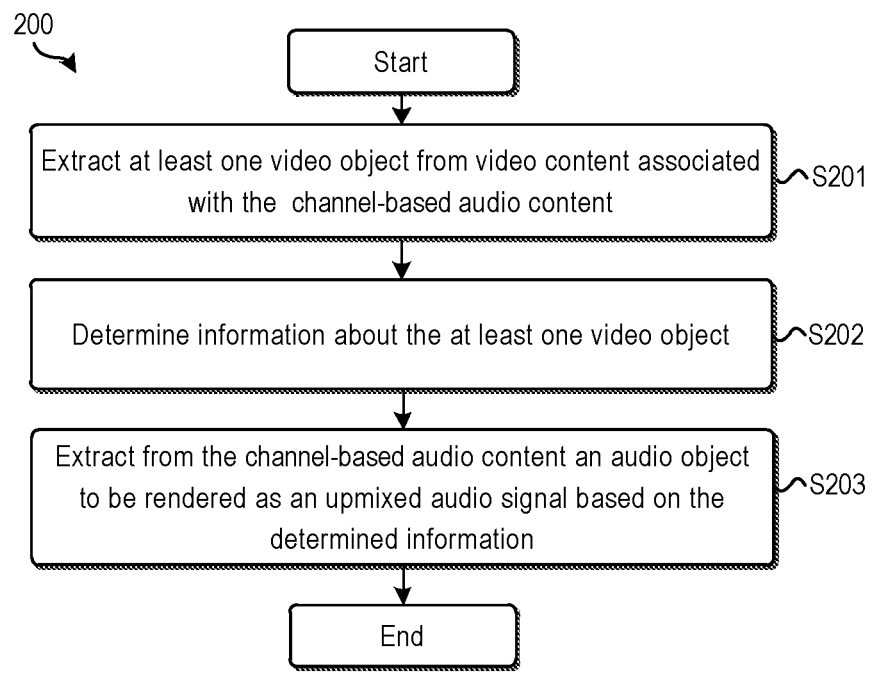
FIG. 2 illustrates a flowchart of a method of video content assisted audio object extraction from audio content in accordance with an example embodiment of the present invention.

Reference is now made to FIG. 2, which shows a flowchart of a method 200 of video content assisted audio object extraction from audio content in accordance with an example embodiment of the present invention. The input audio content may be of a format based on a plurality of channels or a singular channel. For example, the input audio content may conform to mono, stereo, surround 5.1, surround 7.1, or the like. The input audio content may also be associated with corresponding video content. That is, the audio content is aligned with the video content. For example, the audio content and the video content may be included in multimedia content. By separating the multimedia content, the audio content as well as the corresponding video content may be obtained.

At S201, at least one video object is extracted from video content associated with the channel-based audio content.

Since the video content is aligned with the channel-based audio content, video objects contained in the video content may also be aligned with audio objects in the audio content. A video object may be an object presented in the video frames for certain duration of time. For example, a helicopter presented in the video frames may be a video object. If the helicopter is sounding for certain duration of time, it may also be regarded as an audio object. Information about the video objects extracted from the video content may be used to assist the audio object extraction for each frame, or for each time stamp.

In order to determine the video object based information, the video content may be first processed to extract the video object. The video content may be in units of video frames. In one embodiment, a video object may be extracted from video frames of the video content. Note that more than one video objects may be extracted from the video frames, and the number of video frames to be processed may be one or more. The scope of the present invention is not limited in this regard.

It is desired to extract sounding video objects only, which may result in processing complexity. Moreover, extracting all video objects with precise boundaries from the video content may also be challenging. In embodiments of the present invention, for the purpose of assisting audio object extraction without significantly increase the processing complexity, video object extraction may be less precise. That is, there is no strict requirement on the precision of the video object extraction. For example, a region with similar color or texture in the image of the video frame may be roughly considered as a video object. There have been various techniques and algorithms proposed for video object segmentation/tracking. In one example, the video object extraction may be mainly based on the spatial homogeneity of the object. An example process of the spatial homogeneity based video object extraction may have the following steps:

Using morphological filters to simplify an image of an video frame, so as to reduce the noise disturbance for the subsequent processes;

Applying the watershed algorithm on the image for region boundary decision, and merging one or more regions together to avoid possible over segmentation;

Calculating a motion vector of each region by some motion estimation method, such as a steepest descent or hierarchical block matching method; and Merging regions with similar motion together to form the video object region and estimating the motion vector for each video object.

It is noted that there are many other methods for video object extraction and the scope of the present invention is not limited in this regard.

At S202, information about the at least one video object is determined.

The information (also referred to as video object based information) may indicate information about the extracted video object. The video object based information may be determined by analyzing the extracted video object, and may include one or more of a position, an audio template, a size, and the number of the video object. The position information may indicate the position of the extracted video object in a listening space where an audio object corresponding to the video object may be rendered. The audio template may indicate a predefined audio selected from an audio template database based on the type of the extracted video object. The number of the extracted video object may also be useful for audio object extraction. The video object based information may include other information about the video object, such as the type of the video object, the motion of the video object over time, or the like, and the scope of the present invention is not limited in this regard. The determination of video object based information will be described in detail below.

Figure 3:
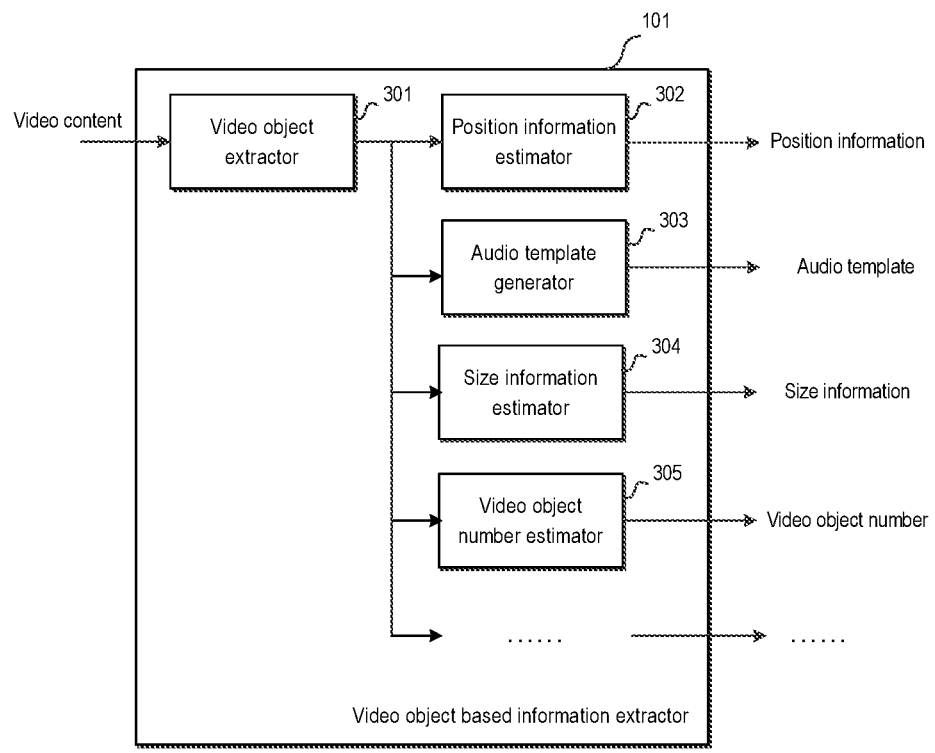
FIG. 3 illustrates a block diagram of a video object based information extractor in the framework of FIG. 1 in accordance with an embodiment of the present invention.

With reference to FIG. 3, a block diagram of a video object based information extractor 101 in accordance with an embodiment of the present invention is shown. By processing the input video content, the video object based information extractor 101 may output the video object based information. Specifically, a video object extractor 301 included in the video object based information extractor 101 may perform video object extraction on the input video content to obtain one or more video objects. The extracted video objects may then be provided to a corresponding video object based information processing unit. As shown in FIG. 3, a position information estimator 302 included in the video object based information extractor 101 may be used to estimate position information of a video object. An audio template generator 303 may be used to generate an audio template of a video object. A size information estimator 304 may estimate size information of a video object, and a video object number estimator 305 may be used to determine the number of the extracted video object(s). Note that the video object based information processing units 302-305 are shown as an example. The video object based information extractor 101 may include more or less processing units than those processing units 302-305.

In some other embodiments, the video object based information may be determined through many other ways, for example, by user input. In some examples, with or without the video object extraction, the number of video objects contained in the video content, the type, the size of each video object, or even the audio template of each video object may be configured by the user.

The method 200 proceeds to S203, where an audio object to be rendered as an upmixed audio signal is extracted from the channel-based audio content based on the determined information.

In audio object extraction, one or more audio objects may be extracted from the audio content. The remaining audio in the audio content other than the audio object signals may be regarded as residual signal. The extracted audio objects may be used for rendering as an upmixed audio signal with the residual signal in subsequent processing.

According to embodiments of the present invention, in order to improve the performance of audio object extraction, for example, to increase the precision of extracted audio object signals, the video object based information may be utilized to assist the audio object extraction. The audio object extraction may be improved based on the video object based information in various ways. For example, depending on the precision level of the video object extraction and the alignment confidence of extracted video object and audio object, the information may be or may not be object-specific. If the information is not object-specific (such as the number of video objects), some general methods, such as tuning the parameter of audio object extraction aggressiveness may be applied to improve the audio object extraction. In some other cases, if the object-specific information is available (such as the position of a specific video object expected to be corresponding to an audio object), more specific method could be applied, for example, by using the position information of the video object as a reference position of the audio object in the audio object extraction.

The audio object extraction with assistance of the video object based information will be described in more detail below.

In the following, the determination of some kinds of video object based information will be described.

Position Information Estimation

The position information estimation may be performed in the position information estimator 302 shown in FIG. 3.

In estimation of a position of a video object in a video frame, a two-dimensional (2D) position and depth of the video object in an image of the video frame may be determined. Based on the region of the extracted video object in the image of the video frame, information of the two-dimensional position and the depth $(X_v, Z_v, D_v)$ may be estimated in the video scene. Here, $(X_v, Z_v)$ represents the 2D position of the video object in the image and $D_v$ represents the depth of the video object.

In one example, the position at the bottom-left corner of the image of the video frame may be defined as $(X_v=0, Z_v=0)$, and the position at the upper-right corner of the image may be defined as $(X_v=1, Z_v=1)$. The 2D position $(X_v, Z_v)$ of the video object may then be determined as the centroid position of the video object region in the image of the video frame.

Several depth estimation algorithms may be used to obtain the video object depth. For 2D video content, the object depth information may be estimated based on, by way of example, the texture gradient, the image structure of the video, or the like. For three-dimensional (3D) video content, video object depth may be already available in certain formats that utilize a depth map. For 3D video formats without the depth information, methods similar to the depth estimation for the 2D video content may be used to reconstruct the depth of the 3D video content.

In order to utilize the video object position to assist subsequent audio object extraction, information of the 2D position and the depth $(X_v, Z_v, D_v)$ may be mapped into a 3D space of listening environment to obtain 3D position information of the video object $(x_v, y_v, z_v)$. The 3D space may be in the audio scene, such as a 3D spatial listening environment where the extracted audio object is to be rendered. The position information $(x_v, y_v)$ may indicate the position of the video object in a screen plane on which the video content would be displayed. A typical example is a movie room or theater with a screen on the front wall, where the video object may be played on the 2D screen and the listening environment is the 3D room with surrounding loudspeakers.

Figure 4:
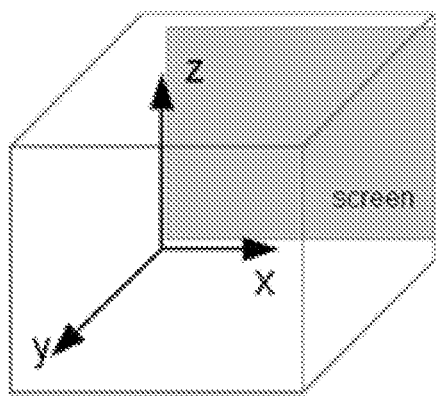
FIG. 4 illustrates a schematic diagram of a generalized spatial listening environment in accordance with an example embodiment of the present invention.

The 3D spatial listening environment may be simplified as a cube room with the side length equal to 1, and the screen is on the front wall with y=0, which is shown in FIG. 4. In one embodiment, the 2D position and the depth ($X_v$, $Z_v$, $D_v$) may be mapped into the position in the 3D space by a mapping function $f_{V \to A}(\ )$, which is represented as below:

$$(x_v, y_v, z_v) = f_{V \to A}(X_v, Z_v, D_v) \quad (1)$$

where the mapping function may be defined depending on various use cases, for example, depending on the physical position of the listener in the cube room. The mapping function for a respective coordinate axis may also be different in some embodiments.

In one example, supposing that the listener is sitting in the middle of the room with position (x, y, z)=(0.5, 0.5, 0), an video object could be mapped into the front half of the room ($x_v \in [0, 1]$, $y_v \in [0, 0.5]$, $z_v \in [0, 1]$) with the following mapping functions:

$$x_v = f_x(X_v, Z_v, D_v) = X_v$$

$$y_v = f_y(X_v, Z_v, D_v) = f_{D \to y}(D_v)$$

$$z_v = f_z(X_v, Z_v, D_v) = Z_v \quad (2)$$

where the X-coordinate and the Z-coordinate of the video object in the video scene are equal to the x-coordinate and the z-coordinate in the audio scene, and the depth of video object is mapped into the y-coordinate in the audio scene by the mapping function $f_{D \to y}(\ )$. In some cases, with the increase of the depth $D_v$, the distance between the listener and the video object is larger, and the $y_v$ value of the video object in the 3D listening environment is smaller. For example, if the depth of the video object is zero, $y_v$ may be 0.5. From the point of the listener in the room, the video object is closed. With the increasing value of the depth, $y_v$ may decrease to zero. The video object is far away from the listener. Therefore, any function that is monotonically decreasing with the increase of the depth and maps the depth to $y_v \in [0, 0.5]$ may be used. One simple example of $f_{D \to y}(\ )$ is given below:

$$f_{D \to y}(D_v) = \frac{0.5}{1 + e^{a_D D_v + b_D}} \quad (3)$$

where $f_{D \to y}(\ )$ is a sigmoid function with parameters $a_D$ and $b_D$. Typically, the parameter $a_D$ may be positive, so that $y_v$ is monotonically decreasing with the increase of the depth.

In the above description, one example of mapping from the position of the video object in the video scene to the audio scene is described. It is noted that many other mapping functions may be used, as long as the position in the 3D space is dependent on one or more values of $X_v$, $Z_v$, $D_v$. For each extracted video object, respective position information may be estimated accordingly.

Audio Template Generation

The audio template generation may be performed in the audio template generator 303 shown in FIG. 3.

During the multimedia content creation stage, especially in the movie industry, lots of audio sources may come from audio object template databases. For example, when the audio mixer wants to add a helicopter sound into a multi-channel audio for a helicopter in the video scene, one of the helicopter audio objects may be selected from the audio object template databases and then mixed into the multi-channel content. Therefore, the predefined audio templates of the video object may also be used as reference signal during audio object extraction, so as to improve the performance of the audio object extraction.

Generally, the audio mixer may select an audio template for a video object based on the type of the video object. For example, for a helicopter, a corresponding helicopter sound may be mixed, and for a motor vehicle, a corresponding sound of roar may be mixed. Therefore, in order to identify the audio template of the video object, in some embodiments, the extracted video object may be compared with predefined video templates to identify the type of the video object (such as a helicopter, a bird, a dog, a motor, or the like). The predefined video templates may come from a video object template database. The video object recognition technique may be applied to identify the type of the video object. Then, based on the type of the video object, the audio template of the video object may be determined from predefined audio templates. Specifically, the audio template may be obtained by searching for the audio object with the specific type from the audio object template database. It is noted that, for each extracted video object, a respective audio template may be determined accordingly. In some cases, some of the extracted audio objects may not be corresponding to any audio template.

Figure 5:
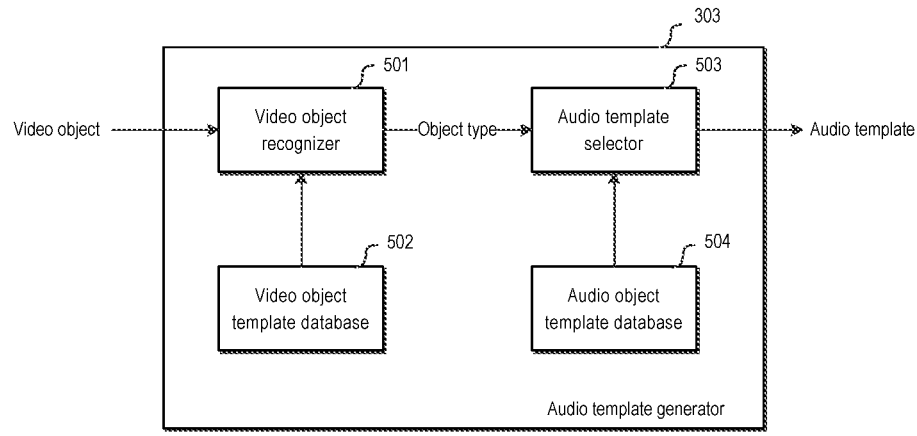
FIG. 5 illustrates a block diagram of an audio template generator in the video object based information extractor of FIG. 3 in accordance with an embodiment of the present invention.

A block diagram of the audio template generator 303 in accordance with an embodiment of the present invention is shown in FIG. 5. A video object recognizer 501 included in the audio template generator 303 may compare the input video object with video object templates in a video object template database 502 by using the video object recognition technique, so as to identify the type of the input video object. The video object recognizer 501 may then provide the identified object type to an audio template selector 503. Based on the object type, the audio template selector 503 may search an audio object template database 504 for a corresponding audio template of the input video object.

Size Information Estimation

The size information estimation may be performed in the size information estimator 304 shown in FIG. 3.

The size of the video object may be estimated by the size of the video object region in the image of the video frame. In some embodiments, an area of the video object in the image of the video frame may be first determined, and then the size information of the video object may be determined based on the area of the video object. It is noted that, for each extracted video object, respective size information may be determined accordingly. For example, a mapping function may be used to map the area of a video object in the image into the size of the video object. The size of the video object may be positively correlated with the size of the object area, which may be represented as following:

$$size_v = f_{sizeV}(size_{R_v}) \quad (4)$$

where $size_{R_v}$ represents the size of the video object area in the image, $size_v$ represents the size of the video object, and $f_{sizeV}(\ )$ represents a monotonically increasing function.

Video Object Number Estimation

The video object number estimation may be performed in the video object number estimator 305 shown in FIG. 3.

Based on the results of the video object extraction, the number of extracted video objects (also referred to as the video object number) $N_v$ may be obtained accordingly. In one embodiment, the video object number may be equal to the number of the video object regions. In some other embodiments, the object regions that represent silent objects may not be counted as the video object, such as a building, a table, a book, or the like.

In the following, the audio object extraction with assistance of the video object based information will be described. As mentioned above, the video object based information, such as the position information, the size information, the audio template, or the number of video object(s), may be used as complementary information in the audio object extraction.

In some embodiments, the position of the video object(s) may be utilized in the audio object extraction.

In the multichannel audio content creation stage, a content creator (audio mixer) may pan an audio object into multiple channels based on the position/direction of the audio object. In most multichannel audio object extraction methods, the panning position/direction of the audio object may be the key for extracting the audio object correctly. Therefore, the position information estimated from the video content may be utilized as the reference audio object position during the audio object extraction. When positions of a plurality of video objects are obtained, some or all of the obtained positions may be used in the audio object extraction.

For example, a typical model used in audio object extraction may be represented as:

$$X = AS + b \quad (5)$$

where X represents the audio content signal (the observed mixed signal), S represents the audio object signal to be extracted, A represents the mixing matrix (panning matrix) which contains panning gains used for panning the audio objects to the audio content signal, and b represents the residual signal which contains ambience and residual noise.

In blind audio object extraction methods such as independent component analysis (ICA) or non-negative matrix factorization (NMF), given an observed mixed signal, the audio object signal as well as the mixing matrix may be estimated jointly by minimizing a cost function. In many cases, a proper initialization of the mixing matrix is critical to avoid the results falling into the local optimum instead of the global optimum.

Therefore, if the position information is used as the reference audio object position in audio object extraction, in one embodiment, a mixing matrix for the audio object extraction may be determined based on the position information of the extracted video object(s). The audio object may then be extracted from the audio content based on the mixing matrix. In one example, the position information may be used to initialize the mixing matrix. In another example, part or the whole of the mixing matrix may be calculated based on the position information.

Since the position information of the video object represents the position in a 3D listening environment where the aligned audio object is to be rendered, while the mixing matrix represents the panning gains of the audio object to multiple channels, the position information may be mapped to the panning gains in the mixing matrix.

With the assistance of the position information of the video object, the blind audio object extraction may be changed to semi-supervised audio object extraction, and then better extraction results may be obtained since the mixing matrix is better initialized by the video object position.

In some embodiments, the audio template of the video object(s) may be utilized in the audio object extraction.

As discussed above, the audio mixer may select an audio template for a specific type of an extracted video object from the audio object template database. Therefore, in one embodiment, the audio template of the video object may be used to determine the audio object signal in the model shown in Equation (5) for the audio object extraction. The audio template of the video object may be determined as an audio object reference signal. Then an audio object may be extracted from the audio content based on the audio object reference signal. When audio templates of a plurality of video objects are obtained, some or all of the audio templates may be used in the audio object extraction.

In an embodiment of canonical correlation analysis, based on audio object reference signal represented by an audio template of a video object, the audio signal that is highly correlated with the reference signal may be extracted from the audio content. The extracted audio signal may be regarded as an audio object corresponding to the video object.

As described above, in the blind audio object extraction, the audio object signal S and the mixing matrix A should be estimated jointly. In another embodiment of semi-supervised audio object extraction, the audio object reference signal represented by the audio templates of the video objects may be used as part or the whole of the audio object signal S, or used to initialize the audio object signal S. Therefore, better extraction results may be obtained since the audio object signal is better initialized or determined by the audio templates.

When utilizing an audio template of a video object, since there may be some time scale discrepancies between the audio template of the video object and an audio object in the audio content, some dynamic alignment methods, such as Dynamic Time Warping, may be used to align the audio template with the mixed multichannel audio content.

In some other embodiments, the number of the extracted video objects may be utilized in the audio object extraction.

In the audio content, the number of audio objects may vary across time, which means that in some cases there may be lots of audio objects, but in some cases there may be no audio object or only a few audio objects. Therefore, to better extract audio objects from the audio content, information on the number of the video objects may be needed to change the audio object extraction aggressiveness or the number of audio objects to be extracted. Although there are some algorithms which automatically estimate the audio object number based on the audio content only, estimating the audio object number based on the video content may be valuable to improve the audio object extraction, especially for the cases where the audio objects mixed in the audio content are completely separated in the video content.

In one embodiment, the number of audio objects to be extracted is an input parameter in the audio object extraction. This number may be determined based on the number of the extracted video objects. For example, the number of audio objects to be extracted may be positively correlated with the number of the extracted video objects. In some embodiments where there is high confidence that the video objects are aligned with the audio objects, the number of the video objects may be directly used as the number of audio objects to be extracted.

In some embodiments, the video object number may be used to modify the aggressiveness of audio object extraction. That is, the audio object extraction may be more conservative if there are few video objects, and the audio object extraction will be more aggressive if there are lots of video objects. As discussed above, in the audio object extraction, the audio objects as well as the residual signal may be extracted. In these embodiments, the number of the video objects may be used to modify the portion of extracted audio objects and residual signal. A gain for the audio object extraction may be determined first based on the number of the video objects, and then the gain may be used to modify the extracted audio object signal after the audio object extraction.

The gain may be applied to the extracted audio object to modify the portion of the audio object signal, and may be determined based on the video object number, which may be represented as:

$$g = f_g(N_v) \qquad (6)$$

where $N_v$ represents the video object number, $f_g(\ )$ represents a monotonically increasing function that maps the video object number to the gain g. The gain may be in a range from 0 to 1. Therefore, if there are lots of video objects, the audio object extraction may be aggressive with the gain close to 1. If there are few video objects, the audio object extraction may be conservative with the gain close to 0.

It is noted that a gain applied to the residual signal may also be determined based on the video object number alternatively. In this case, the gain may be monotonically decreasing with the increase of the video object number.

Figure 6:
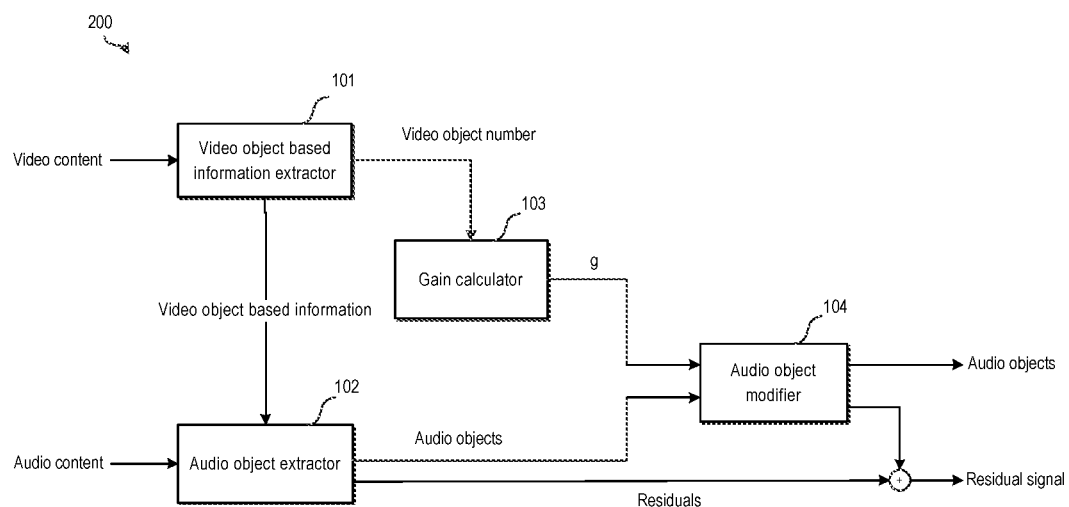
FIG. 6 illustrates a block diagram of a framework for video content assisted audio object extraction from audio content in accordance with another example embodiment of the present invention.

FIG. 6 shows a block diagram of an extended framework 200 for video content assisted audio object extraction from audio content in accordance with an example embodiment of the present invention. The framework 200 may be based on the framework 100 shown in FIG. 1. The video object based information extractor 101 may extract the video object number from the video content to assist the audio object extraction. A gain calculator 103 may determine a gain g for the audio object extraction based on the video object number by a mapping function. The audio object extractor 102 may process the input audio content and separate audio objects and residuals from the audio content. The determined gain g may be applied to the audio object signal in an audio object modifier 104. A portion of an extracted audio object output by the audio object modifier 104 based on the gain g may be considered as a respective audio object. The remaining portion may be added into the residuals from the audio object extractor 102 to be considered as the residual signal.

In some other embodiments, during the audio object extraction, metadata of extracted audio objects may also be determined from the audio content. The metadata may indicate the information on the extracted audio objects, such as the information describing the position, velocity, and the size of the audio objects.

Since an audio mixer may always mix multiple audio objects together based on the video content, there is a correlation between information of the video objects and the actual mixing metadata of the audio objects. Therefore, in some other embodiments, the video object based information, such as the position information, the size information, the video object number, the audio template, the type of the video object, or the like, may be assisted in metadata estimation during the audio object extraction. The video object based information may be used to modify the metadata obtained in the audio object extraction in order to improve the accuracy of the extracted metadata.

Since the metadata is associated with respective extracted audio objects and the assisted information (video object based information) is obtained from respective video objects, in order to better the utilization of the video object based information in metadata estimation, alignment between the audio objects and the video objects may be created first. To avoid using the information from a misaligned video object, pairs of video and audio objects with high alignment confidence may be determined from the extracted video objects and audio objects. Supposing that there are N extracted video objects and M extracted audio objects, K pairs (K≤N and K≤M) of video and audio objects with high alignment confidence may be obtained. The alignment confidence may be measured by correlation/coherence between the video objects and audio objects. In one embodiment, the correlation between an audio object and respective video objects may be calculated. A video object aligned with the audio object may be determined based on the calculated correlation. For example, the video object having the highest correlation with an audio object may be determined among all extracted video objects. The metadata of that audio object may be modified based on the information on the aligned video object, such as the position information, the size information, and the audio template.

In some embodiments, the correlation between a video object and an audio object may be based on the distance between the position information of the video object and position information in the metadata of the audio object. The position information in the metadata of the audio object may be estimated from the audio content only. If the position of the video object is changed in consistence with the change of the position information in the metadata of the audio object, the video object and the audio object have high correlation.

In one example, the correlation is negatively correlated with the distance between the video object and the audio object, which may be represented as:

$$C_{av} = f_{dist \to cor}(\text{dist}(p_a, p_v)) \qquad (7)$$

where $C_{av}$ represents the correlation between the video object and the audio object, $\text{dist}(p_a, p_v)$ represents the distance between the position of the video object and the position of the audio object estimated from the audio content only, and $f_{dist \to cor}(\ )$ represents a monotonically decreasing function.

Alternatively or additionally, the correlation between the video object and the audio object may be based on the similarity between the audio template of the video object and the audio object. In one example, the correlation is positively correlated with the similarity between the audio template of the video object and the audio object, which may be represented as:

$$C_{av} = f_{sim \to cor}(sim(s_a, s_v)) \qquad (8)$$

where $C_{av}$ represents the correlation between the video object and the audio object, $sim(s_a, s_v)$ represents the similarity between the audio template of the video object and the audio object, and $f_{sim \to cor}(\ )$ represents a monotonically increasing function.

In some embodiments, the position of an extracted audio object may be modified based on the position of the aligned video object.

The position of the audio object in the metadata may be used in subsequent rendering of the audio object. In some embodiments, the position of an audio object may include a 2D position $(x_a, y_a)$ in a 2D speaker playout plane for the audio content, such as a floor plane. The position of the audio object may also include height information $(z_a)$. The position may then be represented in a 3D space where the audio object is rendered.

The 2D position $(x_a, y_a)$ of the audio object may be modified based on the 2D position of the video object $(x_v, y_v)$. In one example, the audio object position and the video object position may be linearly combined as following:

$$x_a' = ax_a + (1-\alpha)x_v$$

$$y_a' = ay_a + (1-\alpha)y_v \qquad (9)$$

where $x_a$ and $y_a$ represent the x-coordinate and y-coordinate positions of the audio object determined from the audio content only, $x_v$ and $y_v$ represent the x-coordinate and y-coordinate positions of the video object, $x_a'$ and $y_a'$ represent the modified x-coordinate and y-coordinate positions of the audio object, and a represents the parameter of the linear combination, which may be in the range of 0 to 1.

The height $z_a$ of the audio object is generally needed in order to create the 3D audio object subsequently. However, for the conventional multichannel audio content (surround 5.1, surround 7.1, etc.), all the channels are in the same plane without height information. In this case, the height information should be estimated by other information, such as the 2D position of the audio object, the content type of the audio object, or the like. One typical example of height estimation based on the 2D position of the audio object is shown below:

$$z_a = f_{autoZ}(x_a, y_a) \quad (10)$$

where the height information $z_a$ is calculated based on the 2D position $(x_a, y_a)$ of the audio object, and $f_{autoZ}(\ )$ represents a mapping function that maps the 2D position into the height position automatically, such as a hemisphere function. However, since there is no height information in the extracted audio object, the calculated height estimation may be rough.

To improve the height estimation, the video object based information may be utilized since the height of video object is more straightforward. In one embodiment, the video object assisted estimation of the audio object height may be determined based on the 2D position of the audio object estimated from the audio content only and the 3D position of the video object, which may be represented as:

$$z_a' = f'_{autoZ}(x_a, y_a, x_v, y_v, z_v) \quad (11)$$

where $f'_{autoZ}(\ )$ represents a mapping function that calculates the height information $z_a'$ of the audio object based on its 2D audio object position $(x_a, y_a)$ and the 3D video object position $(x_v, y_v, z_v)$.

In some examples, the height of the audio object may be positively correlated with the height of the video object, which may be represented as:

$$z_a' = f''_{autoZ}(z_v) \quad (12)$$

where $f''_{autoZ}(\ )$ represents a mapping function that maps the height of the video object $z_v$ to the height of the audio object $z_a'$. In one simple example, the height of the audio object $z_a'$ may be equal to $z_v$.

Alternatively or additionally, the video object type may also be utilized for audio object height estimation. For example, if the aligned video object is a helicopter, the height of the audio object may be set to a predefined value.

In some embodiments, since the extracted audio objects may be upmixed to various playback systems, such as loudspeakers and headphones, it is worthwhile to estimate the size of the audio objects in metadata estimation so as to improve the listening experience. For example, if an audio object is not a point source, the size of the audio object may be determined. In subsequent rendering, the audio object may be rendered based on the size information. Therefore, in one embodiment, size of an extracted audio object may be modified based on the size information of the aligned video object.

Since the size information of the video object may be easily estimated based on the region of the video object and there may be a correlation between the video object size and the audio object size, the audio object size may be determined by utilizing the video object size. In one embodiment, the audio object size may be positively correlated with the video object size, which may be represented as:

$$size_a = f_{sizeA}(size_v) \quad (13)$$

where $size_a$ represents the size of the audio object, $size_v$ represents the size of the video object that is aligned with the audio object, and $f_{sizeA}(\ )$ represents a monotonically increasing function.

In the above description, embodiments of determination and utilization of different kinds of video object based information are described. It should be noted that, in assisting the audio object extraction, those embodiments may be employed separately or in combination. It should also be noted that, some examples of the video object based information and its utilization are described only, and many other kinds of video object based information and other utilization methods may also be obtained.

Figure 7:
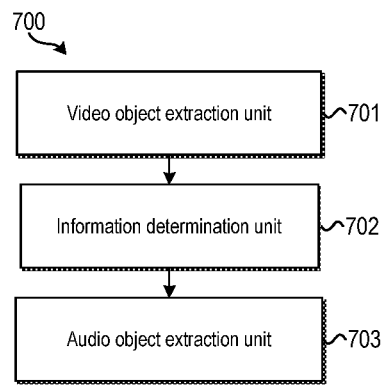
FIG. 7 illustrates a block diagram of a system of video content assisted audio object extraction from audio content in accordance with an example embodiment of the present invention.

FIG. 7 shows a block diagram of a system 700 of video content assisted audio object extraction from channel-based audio content in accordance with an example embodiment of the present invention. As shown, the system 700 comprises a video object extraction unit 701 configured to extract at least one video object from video content associated with the channel-based audio content. The system 700 also comprises an information determination unit 702 configured to determine information about the at least one video object. The system 700 further comprises an audio object extraction unit 703 configured to extract from the audio content an audio object to be rendered as an upmixed audio signal based on the determined information.

In some embodiments, the information determination unit 702 may comprise at least one of a position determination unit configured to determine a position of the at least one video object, an audio template determination unit configured to determine an audio template of the at least one video object, a size determination unit configured to determine a size of the at least one video object, or a video object number determination unit configured to determine the number of the at least one video object.

In some embodiments, the position determination unit may be further configured to determine a two-dimensional position and depth of the at least one video object in a video frame of the video content, and map the two-dimensional position and the depth into a three-dimensional space of listening environment to obtain the position of the at least one video object.

In some embodiments, the audio object extraction unit 703 may be further configured to determine a mixing matrix for audio object extraction based on the position of the at least one video object, and extract the audio object from the channel-based audio content based on the mixing matrix.

In some embodiments, the audio template determination unit may be further configured to identify a type of the at least one video object, and determine, based on the type of the at least one video object, the audio template of the at least one video object from predefined audio templates.

In some embodiments, the audio object extraction unit 703 may be further configured to determine an audio object reference signal based on the audio template of the at least one video object, and extract the audio object from the channel-based audio content based on the audio object reference signal.

In some embodiments where the information may include the number of the at least one video object, and the audio object extraction unit 703 may be further configured to determine the number of audio objects to be extracted based on the number of the at least one video object, and extract the audio object from the channel-based audio content based on the number of the audio objects to be extracted.

In some embodiments where the information may include the number of the at least one video object, and the audio object extraction unit 703 may be further configured to determine a gain for audio object extraction based on the number of the at least one video object, and modify the extracted audio object based on the gain.

In some embodiments, the system 700 may further comprise a metadata determination unit configured to determine metadata of the audio object from the channel-based audio content, and a metadata modification unit configured to modify the metadata of the audio object based on the determined information.

In some embodiments, the metadata may include a position of the audio object. In these embodiments, the metadata modification unit may be further configured to determine a video object aligned with the audio object based on correlation between the video object and the audio object, and modify the position of the audio object based on the position of the aligned video object.

In some embodiments, the metadata may include a size of the audio object. In these embodiments, the metadata modification unit may be further configured to determine a video object aligned with the audio object based on correlation between the video object and the audio object, and modify the size of the audio object based on the size of the aligned video object.

In some embodiments, the correlation between the video object and the audio object may be based on at least one of a distance between the position information of the video object and position information in the metadata of the audio object, or a similarity between the audio template of the video object and the audio object.

For the sake of clarity, some optional components of the system 700 are not shown in FIG. 7. However, it should be appreciated that the features as described above with reference to FIGS. 1-6 are all applicable to the system 700. Moreover, the components of the system 700 may be a hardware module or a software unit module. For example, in some embodiments, the system 700 may be implemented partially or completely with software and/or firmware, for example, implemented as a computer program product embodied in a computer readable medium. Alternatively or additionally, the system 700 may be implemented partially or completely based on hardware, for example, as an integrated circuit (IC), an application-specific integrated circuit (ASIC), a system on chip (SOC), a field programmable gate array (FPGA), and so forth. The scope of the present invention is not limited in this regard.

Figure 8:
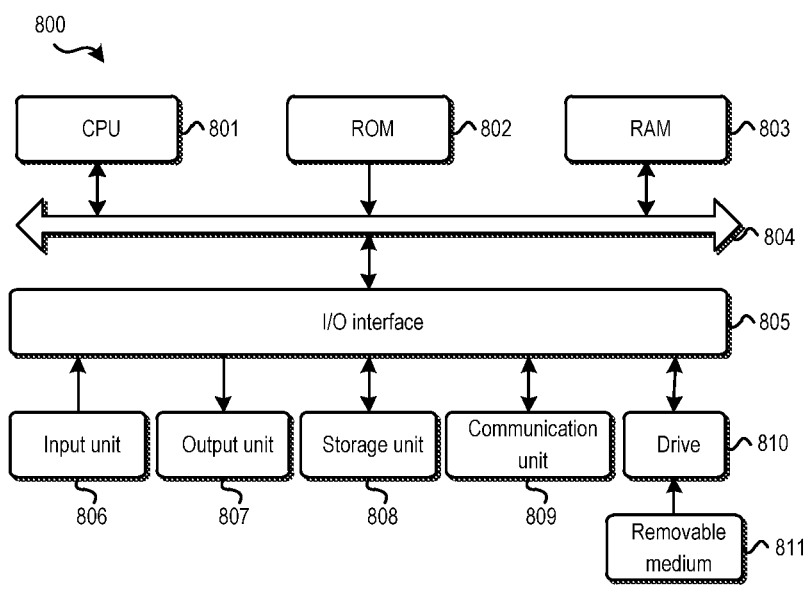
FIG. 8 illustrates a block diagram of an example computer system suitable for implementing embodiments of the present invention.

FIG. 8 shows a block diagram of an example computer system 800 suitable for implementing embodiments of the present invention. As shown, the computer system 800 comprises a central processing unit (CPU) 801 which is capable of performing various processes in accordance with a program stored in a read only memory (ROM) 802 or a program loaded from a storage section 808 to a random access memory (RAM) 803. In the RAM 803, data required when the CPU 801 performs the various processes or the like is also stored as required. The CPU 801, the ROM 802 and the RAM 803 are connected to one another via a bus 804. An input/output (I/O) interface 805 is also connected to the bus 804.

The following components are connected to the I/O interface 805: an input section 806 including a keyboard, a mouse, or the like; an output section 807 including a display such as a cathode ray tube (CRT), a liquid crystal display (LCD), or the like, and a loudspeaker or the like; the storage section 808 including a hard disk or the like; and a communication section 809 including a network interface card such as a LAN card, a modem, or the like. The communication section 809 performs a communication process via the network such as the internet. A drive 810 is also connected to the I/O interface 805 as required. A removable medium 811, such as a magnetic disk, an optical disk, a magneto-optical disk, a semiconductor memory, or the like, is mounted on the drive 810 as required, so that a computer program read therefrom is installed into the storage section 808 as required.

Specifically, in accordance with the embodiments of the present invention, the processes described above with reference to FIGS. 1-7 may be implemented as computer software programs. For example, embodiments of the present invention comprise a computer program product, the computer program product being tangibly stored on a non-transient computer-readable medium and comprising machine executable instructions which, when executed, cause the machine to perform steps of the method 200. In such embodiments, the computer program may be downloaded and mounted from the network via the communication section 809, and/or installed from the removable medium 811.

Generally speaking, various example embodiments of the present invention may be implemented in hardware or special purpose circuits, software, logic or any combination thereof. Some aspects may be implemented in hardware, while other aspects may be implemented in firmware or software which may be executed by a controller, microprocessor or other computing device. While various aspects of the example embodiments of the present invention are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from the operation of computer program code, and/or as a plurality of coupled logic circuit elements constructed to carry out the associated function(s). For example, embodiments of the present invention include a computer program product comprising a computer program tangibly embodied on a machine readable medium, the computer program containing program codes configured to carry out the methods as described above.

In the context of the disclosure, a machine readable medium may be any tangible medium that can contain, or store a program for use by or in connection with an instruction execution system, apparatus, or device. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present invention may be written in any combination of one or more programming languages. These computer program codes may be provided to a processor of a general purpose computer, special purpose computer, or other programmable data processing apparatus, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Various modifications, adaptations to the foregoing example embodiments of this invention may become apparent to those skilled in the relevant arts in view of the foregoing description, when read in conjunction with the accompanying drawings. Any and all modifications will still fall within the scope of the non-limiting and example embodiments of this invention. Furthermore, other embodiments of the inventions set forth herein will come to mind to one skilled in the art to which these embodiments of the invention pertain having the benefit of the teachings presented in the foregoing descriptions and the drawings.

Accordingly, the present invention may be embodied in any of the forms described herein. For example, the following enumerated example embodiments (EEEs) describe some structures, features, and functionalities of some aspects of the present invention.

EEE 1

A method of video content assisted audio object extraction consists of: video object based information extraction from video content, video object assisted audio object extraction from audio content, and video object assisted audio object metadata estimation.

EEE 2

The method according to EEE 1, the video object based information extraction consists of: video object extraction, video object position estimation, audio template generation, video object size estimation, and video object number estimation.

EEE 3

The method according to EEE 2, the video object position estimation consists of: estimation of a video object position in a video scene, and mapping the video object position into a 3D space.

EEE 4

The method according to EEE 3, the depth of the video object is positively correlated with the distance between audience and the video object in the 3D space.

EEE 5

The method according to EEE 2, the audio template generation consists of: estimating the type of the video object based on video object recognition technologies, and searching the audio template from an audio object template database by using the estimated video object type.

EEE 6

The method according to EEE 1, the video object assisted audio object extraction consists of: utilizing the video object number, utilizing the position of the video object, and/or utilizing the audio template of the video object.

EEE 7

The method according to EEE 6, the video object number is utilized to tune the aggressiveness of audio object extraction, and the more the video objects is, the more aggressive the audio object extraction is.

EEE 8

The method according to EEE 7, the video object number is positively correlated with the portion of extracted audio objects to be passed through.

EEE 9

The method according to EEE 7, the video object number is positively correlated with the number of audio objects to be extracted.

EEE 10

The method according to EEE 6, the video object position is utilized to initialize the mixing matrix for the audio object extraction algorithm.

EEE 11

The method according to EEE 6, the audio template of the video object is utilized as a reference signal to extract the audio object signal that highly correlated with the reference signal.

EEE 12

The method according to EEE 6, the audio template of the video object is utilized to initialize the audio object signal for the audio object extraction algorithm.

EEE 13

The method according to EEE 1, the video object assisted audio object metadata estimation consists of: alignment for a video object and an audio object, and improving the audio object metadata estimation based on the information of the aligned video object.

EEE 14

The method according to EEE 13, the alignment for a video object and an audio object is based on the correlation/coherence between the video object and the audio object.

EEE 15

The method according to EEE 14, the correlation/coherence between the video object and the audio object is measured by: the correlation/coherence between the video object position and the audio object position over time, and/or the correlation/coherence between the audio object and the audio template of the video object.

EEE 16

The method according to EEE 13, the improving audio object metadata estimation consists of: estimation of a 2D position of the audio object in the metadata, estimation of height of the audio object in the metadata, and estimation of size of the audio object in the metadata.

EEE 17

The method according to EEE 16, the 2D position of the audio object is modified based on the 2D video object position. That is, the estimated 2D position of audio object shifts towards the 2D video object position.

EEE 18

The method according to EEE 16, the height of the audio object is estimated based on the 3D video object position and the 2D audio object position jointly. The higher the video object is, the higher the audio object is.

EEE 19

The method according to EEE 16, the height of the audio object is estimated based on the video object type. For the video object type that likely has corresponding height information, the related audio object could have a predefined height value.

EEE 20

The method according to EEE 16, the size of the audio object is positively correlated with the size of the video object.

It will be appreciated that the embodiments of the invention are not to be limited to the specific embodiments disclosed and that modifications and other embodiments are intended to be included within the scope of the appended claims. Although specific terms are used herein, they are used in a generic and descriptive sense only and not for purposes of limitation.

What is claimed is:
1. A method of audio object extraction from channel-based audio content comprising:
   extracting at least one video object from video content associated with the channel-based audio content;
   determining information about the at least one video object, the information comprising a position of the at least one video object; and
   extracting from the channel-based audio content an audio object based on the determined information, the extracting comprising determining a mixing matrix for object audio extraction based on the position of the at least one video object, the extracting being based on the determined mixing matrix, the extracted audio object being subsequently rendered as an upmixed audio signal.

2. The method according to claim 1, wherein the determining information about the at least one video object further comprises at least one of:
   determining an audio template of the at least one video object;
   determining a size of the at least one video object; or
   determining the number of the at least one video object.

3. The method according to claim 2, wherein the determining an audio template of the at least one video object comprises:
   identifying a type of the at least one video object; and
   determining, based on the type of the at least one video object, the audio template of the at least one video object from predefined audio templates.

4. The method according to claim 2, wherein the extracting from the channel-based audio content an audio object based on the determined information further comprises:
   determining an audio object reference signal based on the audio template of the at least one video object; and
   extracting the audio object from the channel-based audio content based on the audio object reference signal.

5. The method according to claim 2, wherein the information includes the number of the at least one video object, and wherein the extracting from the channel-based audio content an audio object based on the determined information further comprises:
   determining the number of audio objects to be extracted based on the number of the at least one video object; and
   extracting the audio object from the channel-based audio content based on the number of the audio objects to be extracted.

6. The method according to claim 2, wherein the information includes the number of the at least one video object, and wherein the extracting from the channel-based audio content an audio object based on the determined information further comprises:
   determining a gain for audio object extraction based on the number of the at least one video object; and
   modifying the extracted audio object based on the gain.

7. The method according to claim 2, further comprising:
   determining metadata of the audio object from the channel-based audio content; and
   modifying the metadata of the audio object based on the determined information.

8. The method according to claim 7, wherein the metadata includes a position of the audio object, and wherein the modifying the metadata of the audio object based on the determined information comprising:
   determining a video object aligned with the audio object based on correlation between the video object and the audio object; and
   modifying the position of the audio object based on the position of the aligned video object.

9. The method according to claim 8, wherein the correlation between the video object and the audio object is based on at least one of:
    a distance between the position of the video object and position of the audio object in the metadata of the audio object, or
    a similarity between the audio template of the video object and the audio object.

10. The method according to claim 7, wherein the metadata includes a size of the audio object, and wherein the modifying the metadata of the audio object based on the determined information comprising:
    determining a video object aligned with the audio object based on correlation between the video object and the audio object; and
    modifying the size of the audio object based on the size of the aligned video object.

11. The method according to claim 1, wherein the determining a position of the at least one video object comprises:
    determining a two-dimensional position and depth of the at least one video object in a video frame of the video content; and
    mapping the two-dimensional position and the depth into a three-dimensional space of listening environment to obtain the position of the at least one video object.

12. A computer program product of audio object extraction from channel-based audio content, the computer program product being tangibly stored on a non-transient computer-readable medium and comprising machine executable instructions which, when executed, cause the machine to perform steps of the method according to claim 1.

13. A system of audio object extraction from channel-based audio content comprising:
    a video object extraction unit configured to extract at least one video object from video content associated with the channel-based audio content;
    an information determination unit configured to determine information about the at least one video object and comprising a position determination unit configured to determine a position of the at least one video object; and
    an audio object extraction unit configured to extract from the channel-based audio content an audio object based on the determined information, the extracting comprising determining a mixing matrix for object audio extraction based on the position of the at least one video object, the extracting being based on the determined mixing matrix, the extracted audio object being subsequently rendered as an upmixed audio signal.

14. The system according to claim 13, wherein the information determination unit further comprises at least one of:
    an audio template determination unit configured to determine an audio template of the at least one video object;
    a size determination unit configured to determine a size of the at least one video object; or
    a video object number determination unit configured to determine the number of the at least one video object.

15. The system according to claim 14, wherein the audio template determination unit is further configured to:
    identify a type of the at least one video object; and
    determine, based on the type of the at least one video object, the audio template of the at least one video object from predefined audio templates.

16. The system according to claim 14, wherein the audio object extraction unit is further configured to:
    determine an audio object reference signal based on the audio template of the at least one video object; and
    extract the audio object from the channel-based audio content based on the audio object reference signal.

17. The system according to claim 14, wherein the information includes the number of the at least one video object, and wherein the audio object extraction unit is further configured to:
    determine the number of audio objects to be extracted based on the number of the at least one video object; and
    extract the audio object from the channel-based audio content based on the number of the audio objects to be extracted.

18. The system according to claim 14, wherein the information includes the number of the at least one video object, and wherein the audio object extraction unit is further configured to:
    determine a gain for audio object extraction based on the number of the at least one video object; and
    modify the extracted audio object based on the gain.

19. The system according to claim 14, further comprising:
    a metadata determination unit configured to determine metadata of the audio object from the channel-based audio content; and
    a metadata modification unit configured to modify the metadata of the audio object based on the determined information.

20. The system according to claim 19, wherein the metadata includes a position of the audio object, and wherein the metadata modification unit is further configured to:
    determine a video object aligned with the audio object based on correlation between the video object and the audio object; and
    modify the position of the audio object based on the position of the aligned video object.

21. The system according to claim 20, wherein the correlation between the video object and the audio object is based on at least one of:
    a distance between the position of the video object and position of the audio object in the metadata of the audio object, or
    a similarity between the audio template of the video object and the audio object.

22. The system according to claim 19, wherein the metadata includes a size of the audio object, and wherein the metadata modification unit is further configured to:
    determine a video object aligned with the audio object based on correlation between the video object and the audio object; and
    modify the size of the audio object based on the size of the aligned video object.

23. The system according to claim 13, wherein the position determination unit is further configured to:
    determine a two-dimensional position and depth of the at least one video object in a video frame of the video content; and
    map the two-dimensional position and the depth into a three-dimensional space of listening environment to obtain the position of the at least one video object.

* * * * *